US009948342B2

(12) United States Patent
Shi et al.

(10) Patent No.: US 9,948,342 B2
(45) Date of Patent: Apr. 17, 2018

(54) SPEAKER CASING WITH INTEGRALLY FORMED ELECTRICAL CONDUCTORS

(71) Applicant: Nokia Technologies Oy, Espoo (FI)

(72) Inventors: Shengrong Shi, San Diego, CA (US); Yuanjia Yang, Beijing (CN); Hongjie Li, Beijing (CN)

(73) Assignee: Nokia Technologies Oy, Espoo (FI)

( * ) Notice: Subject to any disclaimer, the term of this patent is extended or adjusted under 35 U.S.C. 154(b) by 35 days.

(21) Appl. No.: 15/102,337

(22) PCT Filed: Dec. 12, 2013

(86) PCT No.: PCT/CN2013/089217
§ 371 (c)(1),
(2) Date: Jun. 7, 2016

(87) PCT Pub. No.: WO2015/085539
PCT Pub. Date: Jun. 18, 2015

(65) Prior Publication Data
US 2016/0323003 A1  Nov. 3, 2016

(51) Int. Cl.
*H01Q 1/00* (2006.01)
*H04B 1/3888* (2015.01)
*H04M 1/03* (2006.01)
*H01Q 1/24* (2006.01)
*H01Q 1/46* (2006.01)
*H04R 1/06* (2006.01)
(Continued)

(52) U.S. Cl.
CPC .......... *H04B 1/3888* (2013.01); *H01Q 1/243* (2013.01); *H01Q 1/36* (2013.01); *H01Q 1/38* (2013.01); *H01Q 1/46* (2013.01); *H04M 1/03* (2013.01); *H04R 1/06* (2013.01); *H04R 2499/11* (2013.01)

(58) Field of Classification Search
CPC ........................................................ H04W 8/00
USPC ..................................................... 455/575.1
See application file for complete search history.

(56) References Cited

U.S. PATENT DOCUMENTS

2004/0036656 A1   2/2004 Nevermann
2006/0223597 A1* 10/2006 Zhu ..................... H04M 1/0202
                                                                    455/575.5
(Continued)

FOREIGN PATENT DOCUMENTS

| CN | 101138131 A | 3/2008 |
| CN | 102204275 A | 9/2011 |
| CN | 102244830 A | 11/2011 |

OTHER PUBLICATIONS

International Search Report and Written Opinion received for corresponding Patent Cooperation Treaty Application No. PCT/CN2013/089217, dated Sep. 17, 2014, 11 pages.

*Primary Examiner* — Wen Huang
(74) *Attorney, Agent, or Firm* — Harrington & Smith

(57) ABSTRACT

An apparatus including a sound transducer; a casing member, where the sound transducer is mounted to the casing member, and where the casing member is configured to at least partially form an enclosure for the sound transducer; and electrical conductors integrally formed with the casing member. The electrical conductors are electrically connected to the sound transducer. The electrical conductors are configured to provide electrical connectivity for the sound transducer, where at least one of the electrical conductors is configured to couple to an antenna pattern to form part of an antenna arrangement.

20 Claims, 4 Drawing Sheets

(51) Int. Cl.
*H01Q 1/36* (2006.01)
*H01Q 1/38* (2006.01)

(56) References Cited

U.S. PATENT DOCUMENTS

| | | |
|---|---|---|
| 2009/0061966 A1 | 3/2009 | Yang et al. |
| 2009/0154756 A1* | 6/2009 | Eaton ................. H04M 1/0277 381/388 |
| 2009/0257207 A1* | 10/2009 | Wang .................... G06F 1/1626 361/752 |
| 2010/0111350 A1* | 5/2010 | Eaton ...................... H04M 1/03 381/386 |
| 2012/0092812 A1* | 4/2012 | Lewis ................ A61B 5/14532 361/679.01 |
| 2012/0188450 A1 | 7/2012 | Lynn et al. |
| 2013/0070952 A1 | 3/2013 | Mai et al. |

* cited by examiner

_US 9,948,342 B2_

SPEAKER CASING WITH INTEGRALLY FORMED ELECTRICAL CONDUCTORS

RELATED APPLICATION

This application was originally filed as Patent Cooperation Treaty Application No. PCT/CN2013/089217 filed Dec. 12, 2013.

BACKGROUND

Technical Field

The exemplary and non-limiting embodiments relate generally to electrical conductors and, more particularly, to an electrical conductor for a sound transducer.

Brief Description of Prior Developments

Laser Direct Structuring (LDS) is known which uses a thermoplastic material, doped with a metal-plastic additive, where the additive is activated by means of a laser. The basic component is single-component injection molded, with practically no restrictions in terms of 3D design freedom. A laser then writes the course of the later circuit trace on the plastic. Where the laser beam hits the plastic the metal additive forms a micro-rough track. The metal particles of this track form the nuclei for the subsequent metallization. In an electroless copper bath the conductor path layers arise precisely on these tracks. LDS has been used to form an antenna on a casing member of a mobile telephone handset.

SUMMARY

The following summary is merely intended to be exemplary. The summary is not intended to limit the scope of the claims.

In accordance with one aspect, an example embodiment is provided in an apparatus including a sound transducer; a casing member, where the sound transducer is mounted to the casing member, and where the casing member is configured to at least partially form an enclosure for the sound transducer; and electrical conductors integrally formed with the casing member. The electrical conductors are electrically connected to the sound transducer. The electrical conductors are configured to provide electrical connectivity for the sound transducer, where at least one of the electrical conductors is configured to couple to an antenna pattern to form at least part of an antenna arrangement.

In accordance with another aspect, an example method comprises providing a casing member, where the casing member is configured to have a sound transducer connected thereto, and where the casing member is configured to at least partially form an enclosure for the sound transducer; and integrally forming electrical conductors on the casing member, where the electrical conductors have first ends located on the casing member to electrically connect to the sound transducer when the sound transducer is connected to the casing member, and where the electrical conductors have second ends located on the casing member to provide electrical connectivity for the sound transducer when the casing member is connected to a second member, where at least one of the electrical conductors is configured to couple to an antenna pattern to form part of an antenna arrangement.

In accordance with another aspect, an example embodiment is provided in an apparatus comprising a casing member, where the casing member is configured to have a sound transducer connected thereto, and where the casing member is configured to at least partially form an enclosure for the sound transducer; an antenna integrally formed with the casing member; and electrical conductors integrally formed with the casing member, where the electrical conductors comprise first ends located on the casing member to electrically connect to the sound transducer when the sound transducer is connected to the casing member, and where the electrical conductors comprise second ends located on the casing member to provide electrical connectivity when the casing member is connected to a second member.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
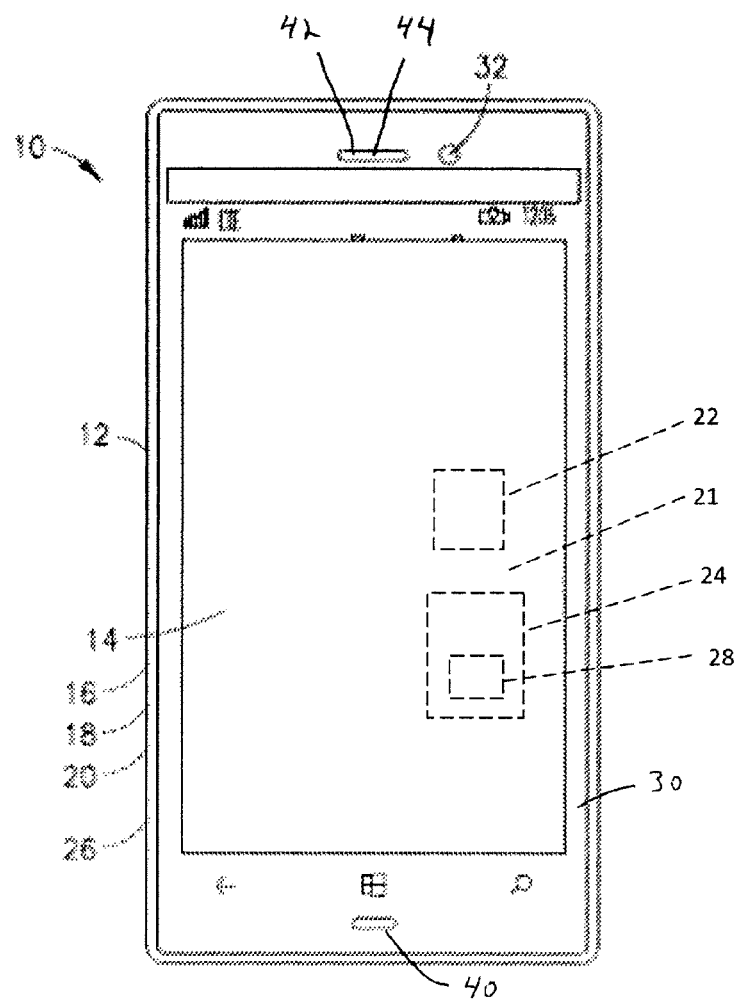
FIG. 1 is a front view of an example embodiment of an apparatus comprising features as described herein.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 may be a hand-held portable apparatus, such as a communications device which includes a telephone application for example. In the example shown the apparatus 10 is a smartphone which includes a camera and a camera application. The apparatus 10 may additionally or alternatively comprise an Internet browser application, a video recorder application, a music player and recorder application, an email application, a navigation application, a gaming application, and/or any other suitable electronic device application. In an alternate example embodiment the apparatus might not be a smartphone.

The apparatus 10, in this example embodiment, comprises a housing 12, a touchscreen 14, a receiver 16, a transmitter 18, a controller 20, a rechargeable battery 26, a rear camera (not shown) and a front camera 32. However, all of these features are not necessary to implement the features described below. The controller 20 may include at least one processor 22, at least one memory 24, and software 28. The electronic circuitry inside the housing 12 may comprise at least one printed wiring board (PWB) 21 having components such as the controller 20 thereon. The receiver 16 and transmitter 18 form a primary communications system to allow the apparatus 10 to communicate with a wireless telephone system, such as a mobile telephone base station for example.

Figure 2:
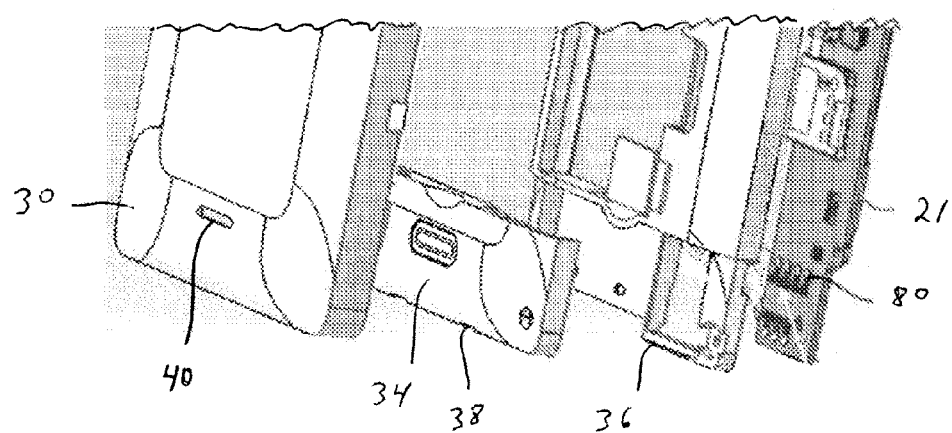
FIG. 2 is an exploded perspective view of some of the components of the apparatus shown in FIG. 1.

Referring also to FIG. 2, components of the apparatus 10 include a front housing member 30, a speaker box 34, a frame member 36, and a printed wiring board 21. The front housing member 30 includes holes 40, 42 for the speaker box 34 and an earpiece 44, respectively. The speaker box forms an enclosure which may prevent sound waves generated by the rearward-facing surface of the diaphragm interacting with sound waves generated at the front of the driver. Because the forward- and rearward-generated sounds are out of phase with each other, any interaction between the two in the listening space may creates a distortion of the original signal as it was intended to be reproduced. Additionally, because they would travel different paths through the listening space, the sound waves would arrive at the listener's position at slightly different times, introducing echo and reverberation effects not part of the original sound.

The speaker box may also plays a role in managing vibration induced by the driver frame and moving airmass within the enclosure, as well as heat generated by driver voice coils.

The speaker box 34, in this example embodiment, is formed with a casing member 38 which is a molded interconnect device (MID). A MID is an injection-molded thermoplastic part with integrated electronic circuit traces. The use of high temperature thermoplastics and their structured metallization opens a new dimension of circuit carrier design to the electronics industry. This technology combines plastic substrate/housing with circuitry into a single part through selective metallization. In this example the MID is formed using Laser Direct Structuring (LDS). However, in alternate example embodiments other types of molding or trace forming could be used.

Figure 3:
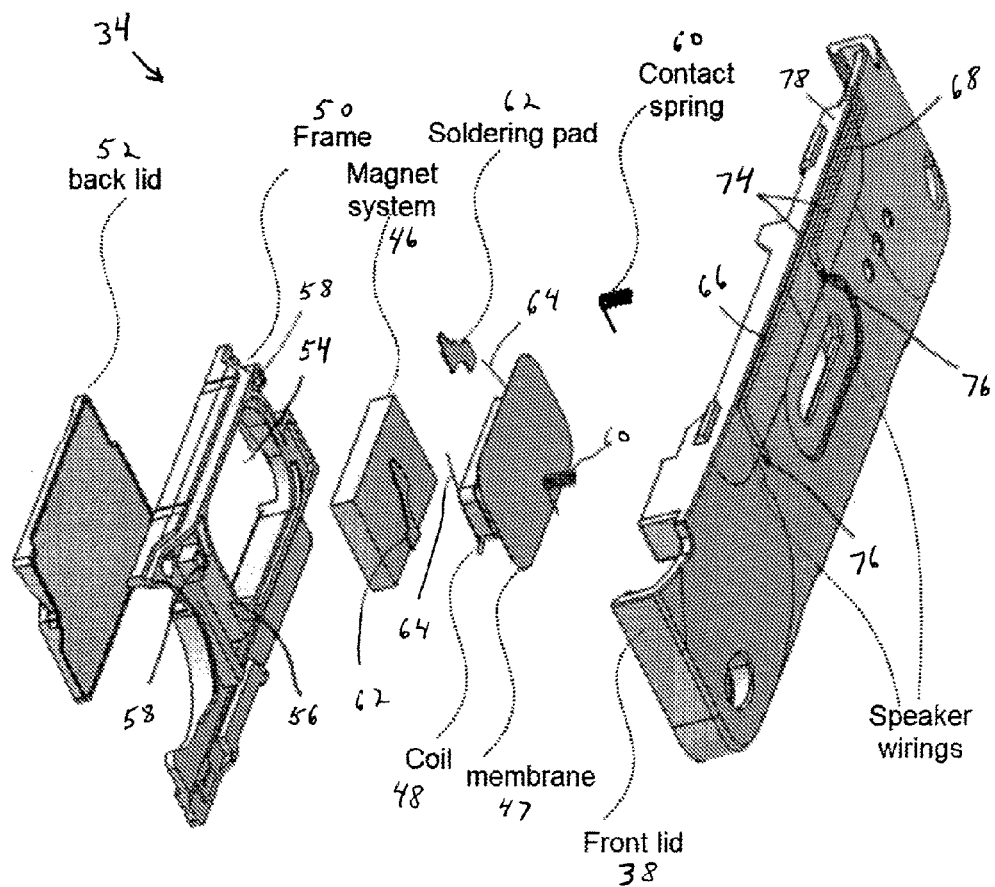
FIG. 3 is an exploded perspective view of some of the components of the apparatus shown in FIGS. 1-2.

Referring also to FIG. 3, the speaker box 34 in this example embodiment generally comprises a magnet system 46, a diaphragm 47, a coil 48 and frame components 38, 50, 52. The components 38, 50, 52 are used to locate the magnet system 46, diaphragm 47 and coil 48 relative to each other, to attach the magnet system 46, diaphragm 47 and coil 48 to other frame components of the housing 12, and to provide a speaker box function for the speaker. The back lid 52 of the speaker box may be provided by the frame member 36 with proper sealing elements, such as a gasket for example. The frame member 50 houses the magnet system 46 in the aperture 54. The diaphragm 47 is attached to the perimeter rim 56 or front lid 38. The coil 48 is attached to the diaphragm 47. Holes 58 are provided in the frame member 50 for the spring contacts 60. Solder pads 62 are provided on the frame 58 to connect the leads 64 of the coil 48 to the spring contacts 60. In an alternate example embodiment any suitable speaker system could be provided including, for example, with a piezoelectric drive or an electrostatic drive, such as for a piezoelectric speaker or a electrostatic speaker, or with a non-permanent electromagnet. The casing member 38 comprises two electrical conductors 66, 68 which are integrally formed on the casing member by the LDS process.

Figure 4:
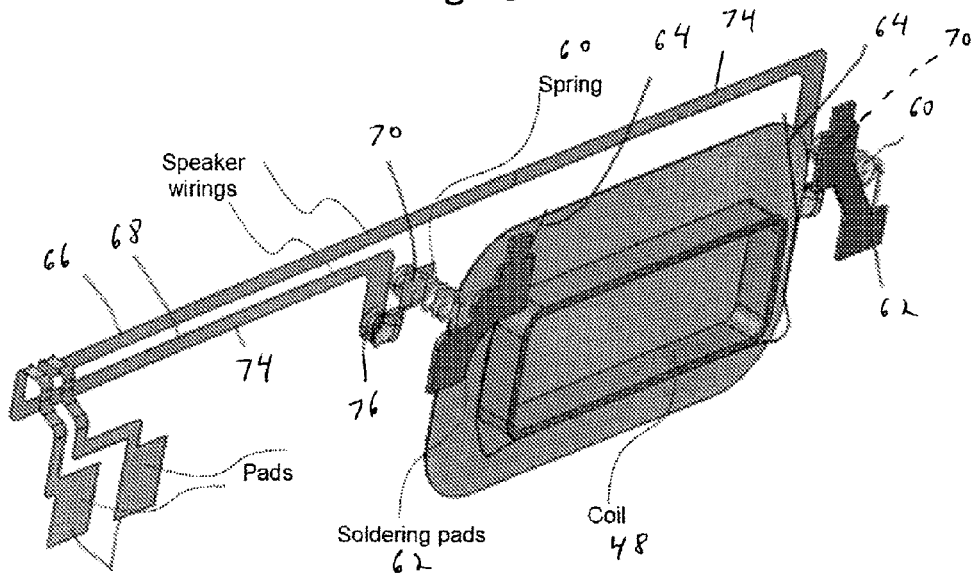
FIG. 4 is a perspective view of some of the components of the apparatus shown in FIG. 3.

Referring also to FIG. 4, the electrical conductors 66, 68 are shown without the casing member merely for the sake of clarity. The electrical conductors 66, 68 are speaker wiring to electrically connect the leads 64 of the coil 48 to another component. In this example the leads 64 are connected to the solder pads 62, and the contact springs 60 connected the solder pads 62 to the electrical conductors 66, 68. The electrical conductors 66, 68 each comprise a first end 70, an opposite second end 72, and a middle section 74 between the first and second ends 70, 72. The first and second ends 70, 72 form contact pads on the inside surface of the casing member 38. The middle sections 74 are located on the opposite outer side of the casing member 38. Vias 76 are provided through the casing member 38 from the first ends 70 to the middle sections 74. The middle sections 74 wrap over the side edge 78 from the middle sections 74 to the second ends 72. In alternate embodiments different wiring patters could be provided.

The components shown in FIG. 3 are assembled as a unified sub-assembly which is able to be attached to other components of the apparatus as a module. When the speaker box 34 is attached to the frame member 36 and PWB 21, the contact pads formed by the second ends 72 connect to contact areas 80 of the PWB 21 to automatically electrical connect the coil 48 to the PWB 21.

Use of a speaker box is becoming an industry trend in mobile communications devices with thinner design trends, such as in smartphones, tablet computers, phabets, etc. However, most of the speaker coil connectivity is still of traditional design such as by using a flexible printed circuit (FPC), insert metal, or soldering cable for example. Traditional coil connectivity often comprises a complex assembly process, and has additional materials cost for FPC or insert metal or soldering cable. For example, an insert metal traditional connectivity comprising stainless steel sheets may be used as the connection material with gold plating on it. This type of connection will usually require a flat surface because of insert metal process limitation. As another example, a FPC traditional connectivity, compared with stainless steel, will be more flexible regarding the speaker box surface. However, it is more expensive than insert metal. Also, sometimes the adhesive or heat stamping process to attach the FPC will also have additional costs and reliability risks.

Features as described herein allow for use of LDS technology as the connectivity between a speaker coil 48 and contact pads 72 on a speaker box. As further described below, this may be used with an LDS antenna on the speaker box as well. With features as described herein, there will be no additional cost for connectivity in contrast with FPC or cable connectivity. The flexibility of LDS technology as used for the speaker connectivity may also be used to provide a better antenna performance. Also, the flexibility will have no limitation on the speaker box surface design, and help design more beautiful curves.

In the example shown in FIGS. 1-4, the back lid and the front lid 38 form an enclosed speaker box. The magnetic system 46 is assembled on the frame 50. The coil 48 may be soldered to the soldering pads 62. The contact springs 60 may electrically connect the soldering pads 62 to the LDS conductors 66, 68.

The conductors 66, 68 may go along the speaker box surface to the pads 72 which may contact C-clips on the PWB 21 provided as the contact areas 80. This may provide a flexible design on a 3D curve compared with traditional FPC design. The pads 72 can be formed together with the conductors 66, 68 with LDS technology, or the pads 72 may be done separately from the LDS process. The first pads 70 may be formed together with the conductors 66, 68 with LDS technology, or the pads 70 may be done separately from the LDS process.

Figure 5:
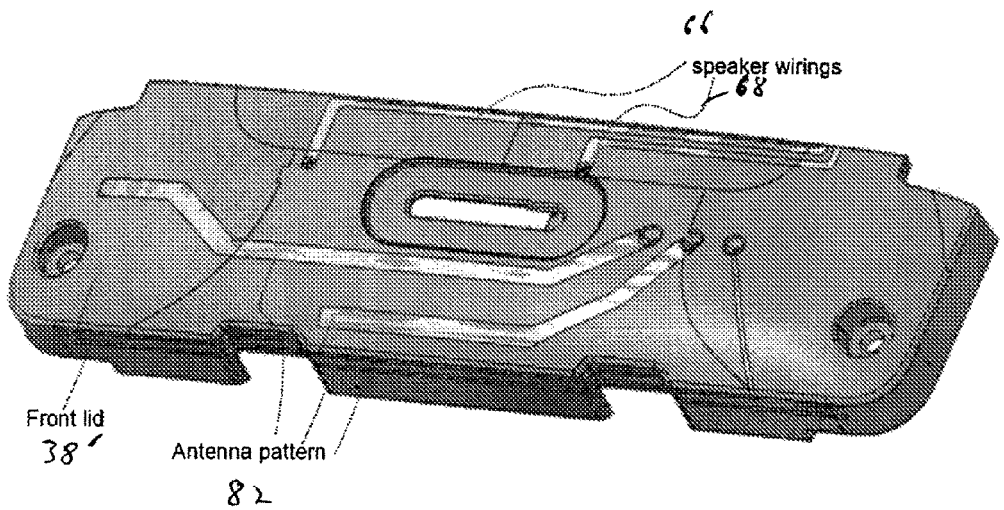
FIG. 5 is a perspective view of an alternate example embodiment.

Laser Direct Structuring (LDS) has been used in the mobile phone industry as an antenna manufacture technology. As noted above, and with reference to FIGS. 5-6, the speaker box may also be the carrier of the antenna pattern(s). In this example the casing member 38' includes the electrical conductors 66, 68 for the speaker and also the antenna pattern 82. If one or more antenna pattern 82 is formed on the casing 38 by the LDS process, the LDS process may be used at the same time to make both the electrical conductors 66, 68 and the antenna pattern 82. This means that the speaker box conductors 66, 68 and the antenna pattern 82 may be made in the same process.

The speaker conductors 66, 68 may also be used as part of the antenna pattern, or part of the antenna parasitics. This may be used to get better antenna performance. In this case, proper decoupling and coupling components may be selected. In the example shown in FIG. 6 a coupling 84 is shown between each of the conductors 66, 68 and two of the antenna patterns 82.

The couplings 84 may comprise coupling capacitors for example. Also in the example shown in FIG. 6 a decoupling 86 is shown between each of the conductors 66, 68 and the pads 62, and a decoupling 88 is shown between each of the conductors 66, 68 and the audio components connected to the PWB 21. The decouplings 86, 88 may be inductors for example. Passive components, such as capacitors 84 and inductors 86, 88 for example, may be located on the PWB 21 and/or on or in the speaker box. In one example embodiment, there may be two pair of decoupling inductors 88 mounted on the PWB 21, and the rest of the inductors 86 may be on the pads 62. In this case, pads 62 may be a smaller PWB also. The coupling capacitors 84 may be on PWB 21 for example. Decoupling components for the antenna arrangement may be used to eliminate interferences from the antenna functionality/performance (or isolate the antenna). In terms of the audio side, similar passive components may be used.

Figure 6:
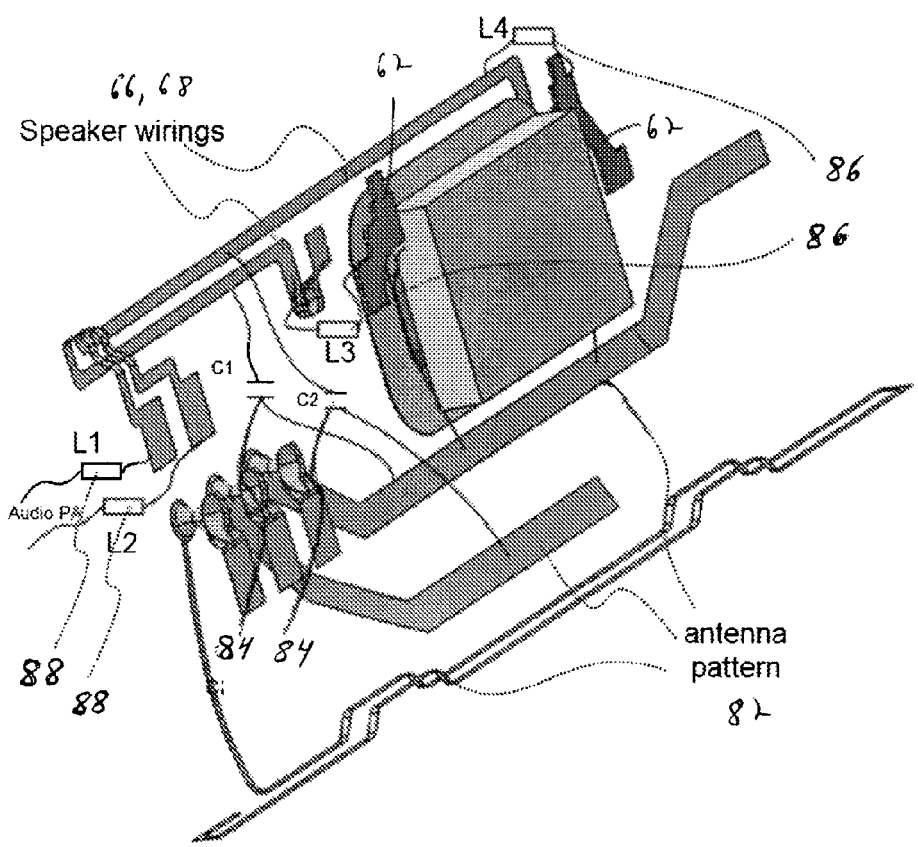
FIG. 6 is a perspective view of some of the components of the embodiment shown in FIG. 5.

FIG. 6 shows how a reusement between the speaker conductors 66, 68 and the antenna pattern 82 as an antenna function. Decoupling inductors 86, 88 are connected at both sides of speaker conductors 66, 68. The inductor value selection (such as 30~100 nH for example) allows the audio signal to pass (such as between about 20~20000 Hz for example), but isolates the RF frequency signal (about 0.9~2.5 GHz for example). The coupling capacitor (such as about 10~50 pF for example) will allow the RF signal to pass, but it will be so small that audio signal will not pass. So they will not impact each other when both functions are working at a same time. In this case, the speaker conductors 66, 68 may be adjusted on its shape according to antenna requirements. The electrical conductors 66, 68 do not need to be as far away from antenna pattern as possible any more. Also, it is not necessary for both of the speaker conductors 66, 68 to be coupled by the coupling 84. In one type of example embodiment only one of the speaker conductors 66, 68 might be coupled by the coupling 84.

When the conductors 66, 68 are reused as part of the antenna, the capacitors 84 allow the RF signal to pass while blocking the audio signal. The inductors 88, allow audio signal to pass while blocking the RF signal. Without capacitors 84, the conductors 66, 68 cannot be part of the RF antenna, and may do harm to RF power amplifier (PA) when Audio power amplifier (PA) is working. Without inductors 88, 86, the whole coil 48 would be part of the antenna, and the coil is so long that it would make the resonance frequency lowered and out of RF bands.

Features as described herein may provide a flexible speaker wiring design and no additional cost if the speaker wiring design is manufactured at the same time and with the same process as the manufacture of the antenna design is manufactured. Features as described herein may provide a more flexible antenna design; perhaps with coupling to the speaker electrical conductors.

Features as described herein may provide a common manufacturing process (such as LDS) to form both the speaker wires and the antenna pattern on a casing member to achieve a compact, cost effective integration and better performance. In one example, it can increase antenna performance by more than 1.5 dB. It can also save about 0.1 Euro in cost by not having to provide a FPC for connectivity to the speaker coil separate from the speaker box.

In one type of example embodiment, an apparatus is provided comprising a sound transducer; a casing member, where the sound transducer is mounted to the casing member, and where the casing member is configured to at least partially form a speaker box; and electrical conductors integrally formed with the casing member, where the electrical conductors are electrically connected to the sound transducer, and where the electrical conductors are configured to electrically connect the sound transducer to a second member. The casing member may be a single part, but in alternative embodiments it could be formed using separate parts where these separate parts could accommodate the electrical conductors. For example, the casing member could comprise a pot like part and a lid, wherein the pot and lid are ultrasonically welded, glued and/or heat-staked together during the manufacturing of the part. As used herein, "mounted" may mean that the speaker is positioned or located within the casing member. The speaker may be integrally formed inside the casing, i.e. the chassis of the speaker may be formed by the casing, but in some designs the speaker may be positioned inside an aperture being formed inside the casing where speaker drops or fits into. An adhesive or gasket material may be used between the speaker and the aperture of the casing. The casing member may be formed by two or more different parts which could be ultrasonically welded together for example. The casing member may be formed by separate members (parts) which function together to enclose the speaker component and acoustic volumes for the speaker component. The speaker component may be positioned in a speaker aperture formed inside one part of the casing member that receives the speaker, and the electrical conductors could be located on another one of the casing member parts.

The sound transducer may comprise a coil, and where the electrical conductors are connected to leads of the coil. The electrical conductors may comprise first and second opposite ends which are located on a first side of the casing member, and the electrical conductors may comprise a middle section located on a different second side of the casing member. The electrical conductors may be integral with the casing member by a Laser Direct Structuring (LDS) process. The apparatus may further comprise an antenna integrally formed with the casing member. The antenna may be integral with the casing member by a Laser Direct Structuring (LDS) process. The apparatus may further comprise an antenna integrally formed with the casing member. The apparatus may further comprise at least one coupling which couples at the antenna to at least one of the electrical conductors. The apparatus may further comprise at least one decoupling which decouples the electrical conductors from the sound transducer and/or the second member. The apparatus may further comprise a printed wiring board connected to the electrical conductors; an electrical display connected to the printed wiring board; a receiver connected to the printed wiring board; a transmitter connected to the printed wiring board; a processor connected to the printed wiring board; a memory connected to the printed wiring board; and a battery connected to the printed wiring board. Features as described herein may be implemented using other techniques besides LDS, such as an Ag printing process, a pad printing process or an insert molding process for example.

Figure 7:
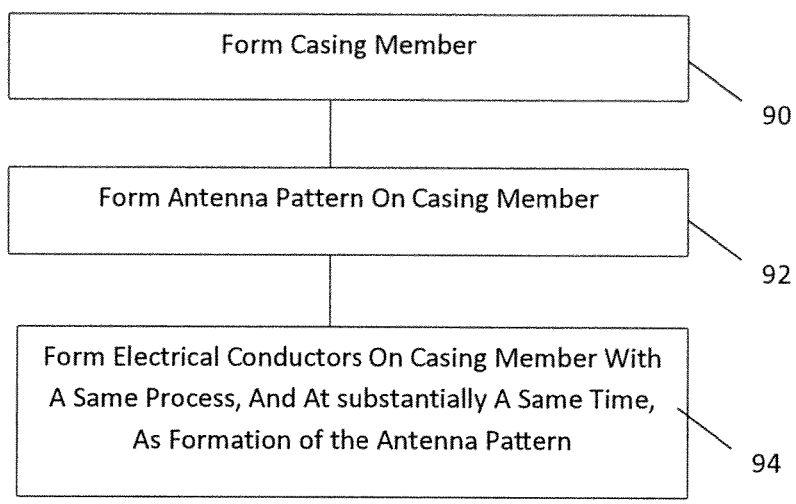
FIG. 7 is a diagram illustrating an example method.

Referring also to FIG. 7, an example method may comprise forming a casing member as illustrated by block 90, forming an antenna pattern on the casing member as illustrated by block 92, and forming electrical conductors on the same casing member as illustrated by block 94. The casing member may be a part of a speaker box. The antenna pattern and the electrical conductors may be formed by a same process, such as LDS for example. Because the antenna pattern and the electrical conductors may be formed by a same process, the antenna pattern and the electrical conductors may be formed at substantially a same time with the same process. Thus, no additional electrical conductivity for connecting the speaker to a PWB is needed.

An example method may comprise providing a casing member, where the casing member is configured to have a sound transducer connected thereto, and where the casing member is configured to at least partially form a speaker box; and integrally forming electrical conductors on the casing member, where the electrical conductors have first ends located on the casing member to electrically connect to the sound transducer when the sound transducer is connected to the casing member, and where the electrical conductors have second ends located on the casing member to electrically connect to a second member when the casing member is connected to the second member.

The electrical conductors may be integrally formed on the casing member with a Laser Direct Structuring (LDS) process. The first and second ends may be located on a first side of the casing member, and the electrical conductors may comprise a middle section located on a different second side of the casing member. The method may further comprise integrally forming an antenna on the casing member. The antenna may be integrally formed on the casing member with a Laser Direct Structuring (LDS) process. The method may further comprise coupling the antenna to at least one of the electrical conductors. The method may further comprise decoupling the electrical conductors from the sound transducer and/or the second member.

An example embodiment may be provided in an apparatus comprising a casing member, where the casing member is configured to have a sound transducer connected thereto, and where the casing member is configured to at least partially form a speaker box; an antenna integrally formed with the casing member; and electrical conductors integrally formed with the casing member, where the electrical conductors comprise first ends located on the casing member to electrically connect to the sound transducer when the sound transducer is connected to the casing member, and where the electrical conductors comprise second ends located on the casing member to electrically connect to a second member when the casing member is connected to the second member.

The electrical conductors and the antenna may be integral with the casing member by a Laser Direct Structuring (LDS) process. Majorities of the electrical conductors and the antenna may be located on a first side of the casing member, and contact areas of the electrical conductors and the antenna may be located on an opposite second side of the casing member.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   a sound transducer;
   a casing member, where the sound transducer is mounted to the casing member, and where the casing member is configured to at least partially form an enclosure for the sound transducer; and
   at least two electrical conductor wirings integrally formed with the casing member, where the at least two electrical conductor wirings are electrically connected to the sound transducer, and where the at least two electrical conductor wirings are configured to provide electrical connectivity for the sound transducer, where at least one of the at least two electrical conductor wirings is configured to couple to an antenna pattern to form at least part of an antenna arrangement.

2. The apparatus as in claim 1, wherein the sound transducer comprises a coil, the at least two electrical conductor wirings are connected to leads of the coil, and the at least one electrical conductor wiring is connected to the antenna pattern.

3. The apparatus as in claim 1, where the at least two electrical conductor wirings comprise first and second opposite ends which are located on a first side of the casing member, and the at least two electrical conductor wirings comprise a middle section located on a different second side of the casing member.

4. The apparatus as in claim 1, where the at least two electrical conductor wirings are integral with the casing member by a Laser Direct Structuring (LDS) process.

5. The apparatus as in claim 1, further comprising an antenna integrally formed with the casing member, where the antenna forms the antenna pattern.

6. The apparatus as in claim 5, where the antenna is integral with the casing member.

7. The apparatus as in claim 1, further comprising an antenna integrally formed with the casing member, where the antenna forms the antenna pattern.

8. The apparatus as in claim 7, further comprising at least one coupling component which couples at the antenna to at least one of the at least one electrical conductor wiring.

9. The apparatus as in claim 7, further comprising at least one decoupling component which decouples the at least one electrical conductor wiring from the sound transducer and/or a second member.

10. The apparatus as in claim 1, further comprising:
    a printed wiring board connected to the at least two electrical conductor wirings;
    an electrical display connected to the printed wiring board;
    a receiver connected to the printed wiring board;
    a transmitter connected to the printed wiring board;
    a processor connected to the printed wiring board;
    a memory connected to the printed wiring board; and
    a battery connected to the printed wiring board.

11. The apparatus as claimed in claim 1, wherein the casing member is configured to at least partially form a speaker box for the sound transducer.

12. The apparatus as claimed in claim 11, wherein the speaker box is formed by one of:
    two or more different parts which function together to enclose the speaker component and acoustic volumes for the speaker component; and
    a single part as being at least one of: ultrasonically welded, glued and heat-staked together.

13. A method comprising:
    providing a casing member, where the casing member is configured to have a sound transducer connected thereto, and where the casing member is configured to at least partially form an enclosure for the sound transducer; and integrally forming at least two electrical conductor wirings on the casing member, where the at least two electrical conductor wirings have first ends located on the casing member configured to electrically connect to the sound transducer when the sound transducer is connected to the casing member, and where the at least two electrical conductor wirings have second ends located on the casing member configured to provide electrical connectivity for the sound transducer when the casing member is connected to a second member, where at least one of the electrical conductor wirings is configured to couple to an antenna pattern to form at least part of an antenna arrangement such that both the at least one electrical conductor wiring and the antenna pattern form at least part of the antenna arrangement.

14. The method as in claim 13, where the at least two electrical conductor wirings are integrally formed on the casing member with a Laser Direct Structuring (LDS) process.

15. The method as in claim 13, where the first and second ends are located on a first side of the casing member, and the at least two electrical conductor wirings comprise a middle section located on a different second side of the casing member.

16. The method as in claim 13, further comprising integrally forming an antenna on the casing member, the antenna forms the antenna pattern, and the at least one electrical conductor wiring is connected to the antenna pattern.

17. The method as in claim 16, where the antenna is integrally formed on the casing member with a Laser Direct Structuring (LDS) process.

18. An apparatus comprising:
a casing member, where the casing member is configured to have a sound transducer connected thereto, and where the casing member is configured to at least partially form an enclosure for the sound transducer;
at least one antenna element integrally formed with the casing member; and
at least two electrical conductor wirings integrally formed with the casing member, where the at least two electrical conductor wirings comprise first ends located on the casing member configured to electrically connect to the sound transducer when the sound transducer is connected to the casing member, and where the at least two electrical conductor wirings comprise second ends located on the casing member configured to provide electrical connectivity for the sound transducer when the casing member is connected to a second member, where at least one of the at least two electrical conductor wirings is coupled to the at least one antenna element.

19. The apparatus as in claim 18, where the at least two electrical conductor wirings and the at least one antenna element are integral with the casing member by a Laser Direct Structuring (LDS) process, and where the at least one electrical conductor wiring is connected to the at least one antenna element or forms a parasitic element for the at least one antenna element.

20. An apparatus as in claim 18, where majorities of the at least two electrical conductor wirings and the at least one antenna element are located on a first side of the casing member, and where contact areas of the at least two electrical conductor wirings and the at least one antenna element are located on an opposite second side of the casing member.

* * * * *